Dec. 12, 1967  H. W. BLETZ  3,358,101
CREEP TYPE THERMOSTATIC CONTROL HAVING
FINE TEMPERATURE ADJUSTMENT
Filed Oct. 11, 1965
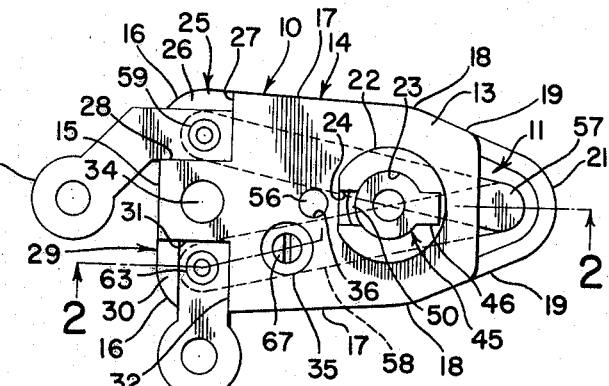
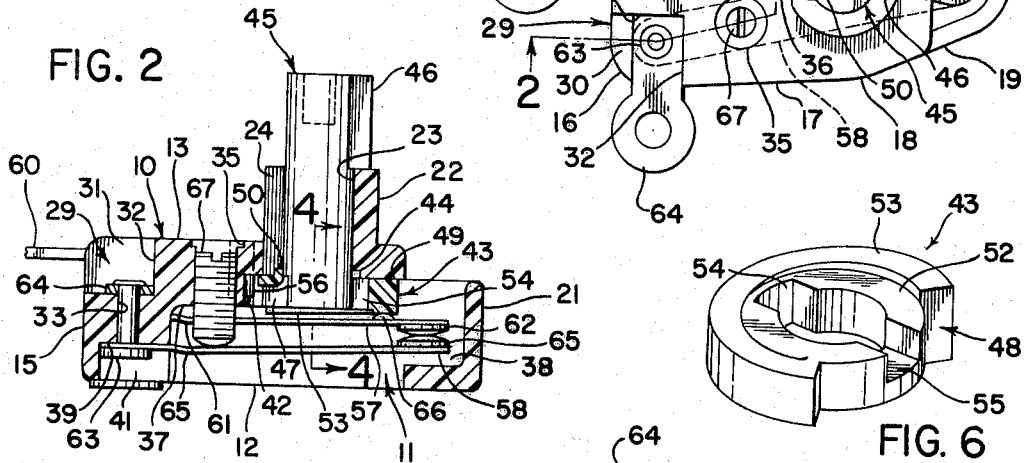
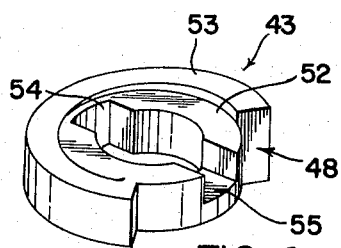
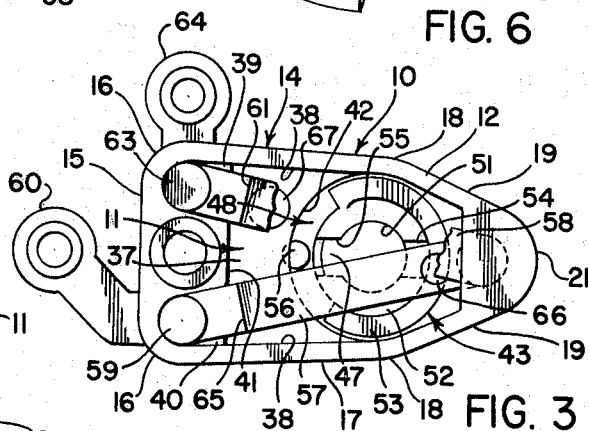
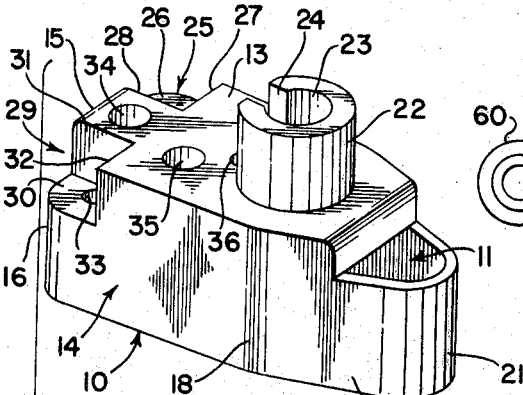
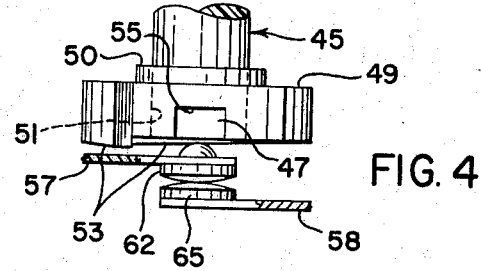
INVENTOR.
HOWARD W. BLETZ
BY Adrian Medert
ATTORNEY

United States Patent Office 3,358,101
Patented Dec. 12, 1967

3,358,101
CREEP TYPE THERMOSTATIC CONTROL HAVING FINE TEMPERATURE ADJUSTMENT
Howard W. Bletz, Mansfield, Ohio, assignor to Therm-O-Disc, Incorporated, Mansfield, Ohio, a corporation of Ohio
Filed Oct. 11, 1965, Ser. No. 494,466
5 Claims. (Cl. 200—139)

This invention relates to thermostatic controls and more particularly to a control of the creep type wherein relatively fine adjustment in the temperature range at which the device operates may be accomplished.

Heretofore, temperature control devices of the creep type generally used in various kinds of small household appliances, have embodied many drawbacks and undesirable features. For example, such devices have required a multiplicity of components to effect the desired end resulting in a manufacturing cost which was considered excessive. In addition, the prior devices have had serious limitations in application and use due to the problems encountered in maintaining temperature calibration during the mounting or assembly of the control in an appliance. Further, the inherent structural characteristics of such devices enhances leakage of current from the control to the surrounding components of the appliance and to the appliance itself, much to the annoyance, irritation, and discomfort of the user of the appliance, as well as presenting a hazardous condition from a safety standpoint.

Accordingly, it is among the objects of the present invention to provide a new and novel thermostatic control for use with small electrical household appliances which overcomes the drawbacks and undesirable features of prior devices as is indicated by the foregoing statement of the problem and which is of simple construction, uniform and positive in operation within a predetermined temperature range and economical to manufacture.

It is another object of the invention to provide a new and improved thermostatic control wherein minute temperature adjustment at which the device operates may be obtained within the predetermined calibrated temperature range of the device.

Another object of the invention is to provide a thermostatic control which is so designed that it may be efficiently and economically mounted in an appliance without altering or varying its precalibrated condition.

Another object of the invention is to provide a thermostatic control constructed in such a manner that the assembled elements can withstand the shocks of normal handling and operation without effecting the preset operating characteristics of the device.

These and other objects and advantageous features of the invention not at this time more particularly pointed out will become apparent as the nature of the invention is better understood from the following detailed description taken in conjunction with the accompanying drawings wherein like reference characters denote corresponding parts, and wherein:

FIGURE 1 is a top plan view of a thermostatic control device embodying the present invention with certain switch elements shown in phantom, FIGURE 2 is a transverse medial sectional view of the thermostatic control device taken on the line 2—2 of FIGURE 1, FIGURE 3 is a bottom plan view of the thermostatic device with parts broken away, FIGURE 4 is a fragmentary sectional view of the thermostatic device taken on the line 4—4 of FIGURE 2, FIGURE 5 is an exploded perspective view of the thermostatic device showing the relative position of certain components of the device, and FIGURE 6 is an enlarged perspective view of one of the components shown in FIGURE 5.

Referring now to the drawings and particularly FIGURES 1 and 3, the thermostatic control device of the present invention includes a housing member 10, preferably made of an electrical insulating material, heat resistant to a fair degree, such as a phenolic condensation product. The housing 10 defines a cavity 11 which forms the space in which the various component elements of the switch are contained and has an open bottom portion 12, a top 13, and side walls 14 extending at right angles to the top 13.

The contour of the housing 10 is defined by the side walls 14 as shown in FIGURE 1. Beginning from a planar wall segment 15, the side walls 14 extend from each end of said wall segment 15 by curving around arcuate wall segments 16 and merging into wall segments 17 which directionally converge as they proceed away from the segment 15. Wall segments 17 join transitional wall segments 18 before the latter pass into segments 19 which directionally converge more sharply than do segments 17. Finally, connecting segments 17, and forming the end portion of the housing 10 opposite the segment 15, is an arcuate wall segment 21.

Projecting from the upper surface of top 13 of the housing 10 and integrally formed therewith is a hollow cylindrical stack 22 which provides an opening 23 leading into the cavity 11. Co-extensive with the height of the stack 22 and extending through the wall thereof is a slot 24 which will be referred to more in detail hereinafter.

One of the side wall segments 16 is cut-away to form a relatively shallow corner recess 25 having a supporting surface 26 and wall portions 27 and 28 extending at right angles to each other. Similarly, the opposed wall portion 16 is cut-away to form a deeper recess 29 having a flat supporting surface 30 and side walls 31 and 32 extending at right angles to each other. Cylindrical openings 33 are centered in the recesses 25 and 29 and project through the supporting surfaces 26 and 30, respectively, into the cavity 11. Also, extending through the top wall 13 of the housing and into the cavity 11 are three cylindrical openings 34, 35, and 36. The purpose of the various openings through the top wall 13 into the cavity 11 will become more apparent as the description of the device continues.

As aforementioned, the housing 10 defines a cavity 11 having a bottom wall surface 37 which cavity houses the several components of the electrical switch of the control. The contour of the cavity 11 is best shown in FIGURE 3 and comprises an inside wall 38 which substantially parallels the outside wall 14 in its several segments.

The portion of the bottom wall surface 37 of cavity 11 opposed to the exterior surface 26 is formed with a supporting ledge 39. Similarly, a supporting ledge 40 is formed on the bottom wall surface opposed to the exterior supporting surface 30. The supporting ledges 39 and 40 are connected by the openings 33 with supporting surfaces 26 and 30, respectively. The ledges 39 and 40 are relatively spaced with respect to each other and the bottom wall surface 37.

Intermediate the ledges 39 and 40 there is disposed a boss 41 coextensive with the side wall 38 and provided with the opening 34 therethrough for receiving a suitable mounting member (not shown) for positioning the control in an appliance. The bottom wall 37 is depressed to form a substantially circular recess 42 which receives a disc-like cam member 43. It is to be noted that the cylindrical opening 23 of the stack 22 and the slot 24 extend through the bottom wall of the recess 42. Surrounding the opening 23, the bottom wall of the recess 42 is cut-away to form a counter bore 44.

Referring to FIGURES 2 and 5 of the drawings, the stack 22 of the housing 10 has rotatably mounted in the opening 23 thereof a generally cylindrical adjusting stem 45 having a diameter such that the stem 45 is loosely journaled within the opening 23. The stem 45 (FIGURE 5) has a generally elongated rectangular key 46 integrally formed therewith adjacent one end and a second, but smaller, generally rectangular key 47 at the opposite end and diametrically opposed to key 46. Both keys 46 and 47 are of such sizes and shape that they engage within the slot 24 of the opening 23 in the stack 22.

As aforementioned, the cam 43 (FIGURES 4, 5, and 6) is generally circular in shape except for a peripheral cutaway portion 48, and has one surface 49 generally planar with a circular collar 50 surrounding an opening 51 therethrough, which collar seats within the counterbore 44 of the opening 23. The surface 52 of the cam 43, opposite the surface 49, is provided with an inclined peripheral ridge 53 rising therefrom, which ridge, depending upon its degree of inclination is effective to determine the amount of the temperature adjustment within the preset ranges. The cam 43 is also provided with a generally rectangular keyway 54 which extends from the opening 51 toward the periphery of the cam, terminating short of the ridge 53 and is coextensive with the thickness of the cam 43. Diametrically opposed to keyway 54 is a second generally rectangular keyway 55, extending from the opening 51 and intersecting the portion 48 and having a depth less than the thickness of the cam element. The keyways 54 and 55 are of such size and shape as to accommodate the keys 46 and 47, respectively, of the adjusting stem 45.

In assembling the adjusting stem 45 and the cam 43 within the housing 10, the cam 43 is first seated within the recess 42 with the circular collar 50 engaging in the counterbore 44 of the recess 42. The loosely fitting relationship between the stem 45 and the interior wall of the stack 22 and the cam element 43 within its containing recess, provides a certain amount of float which is effective to absorb much of the normal abuse which a device is subjected to in transit and in mounting in an appliance without altering or changing the operating temperature range to which the device has been calibrated. The keyway 54 of the cam 43 is aligned with the slot 24 of the stack 22, and the adjusing stem 45 is then introduced through the cylindrical openings 23 and 51, the key 47 passing through the stack slot 24 and keyway 54. The adjusting stem 45, when thus assembled in the housing 10, has the bottommost portion of the key 46 resting on the upper surface of the stack 22, while the lower key 47 is disposed in the keyway 55.

With reference to FIGURES 1 and 3, the opening 36 extending through the housing base 10, intersects the peripheral wall of the recess 42. After being positioned as described above, the adjusting stem 45 and the cam 43 are rotated so that the opening 36 is exposed to the cutaway portion 48 of the cam 43, a stop pin 56 is then inserted through the opening 36 into the recess 42, thus permanently locking the adjusting stem 45 and cam 43 in the housing 10. When so positioned, the stop pin 56 prevents the cam 43 from being rotated to align the key 47 of adjusting stem 45 with the slot 24. The cam 43 may, however, be rotated to some extent by turning the adjusting stem 45, the precise limits of such rotation being defined by the ends of the cutaway portion 48 of the cam.

With reference to FIGURES 2 and 3, contact carrying arms 57 and 58 are cantilever mounted in the cavity 11 of the housing 10. One end of arm 57 is mounted on the ledge 40 and is secured by means of a terminal rivet 59 extending through opening 33 and secured to lead-in connection 60. The arm 57 is constructed of a metal having good electrical current carrying properties as well as good spring like properties, such as a beryllium-copper alloy. The arm 57 is formed with a bend as at 61 to effect a biasing of the outer free end thereof away from the open end portion 12 of the housing 10, and is mounted to extend at an angle with respect to the adjacent side wall segment 17 and terminate within the confines of the vertex formed by the wall segments 19 and 21. Secured to the lower surface of the outer end of the arm 57 is a contact button 62. Similarly, arm 58 is supported at one end on the surface 39, being secured thereon by a rivet 63 extending through the opening 33, which in turn is secured to the lead-in terminal 64. The arm 58 is constructed of a bimetallic material and formed with a bend at 65 to effect biasing of the outer free end thereof toward the arm 57. The arm 58 extends at an angle converging toward the arm 57, having the outer free end thereof overlying the end of the arm 57. A contact button 65 is secured to the end of arm 58 and is adapted to engage the contact button 62 on the arm 57. On the upper surface of the arm 57 there is a dimple 66 integrally formed therewith and so positioned thereon that it will continuously engage the surface of the ridge 53 on the bottom surface 52 of cam 43.

Engagement of the dimple 66 of the contact carrying arm 57 with the camming surface 53 provides extremely accurate temperature control when using the herein described thermostatic device, for by rotating adjusting stem 45, minute adjustments can be made in the temperature range through which the thermostatic control operates.

The opening 35 in the housing 10 is suitably threaded to receive an adjusting screw 67 which extends downwardly into the cavity 11. The free end of the adjusting screw 67 bears against the upper surface of arm 58, as is shown in FIGURE 2.

The operation of the thermostatic control of the present invention should be readily apparent to those skilled in the art. The temperature range within which the contacts 62 and 65 may be opened or closed can be easily varied by an adjustment of the screw 67, while the particular temperature within a given range at which the contacts will open or close may be varied by a rotation of the stem 45, which in turn rotates the cam 43.

Having thus described my invention so that persons skilled in the art may understand and practice the same, what I desire to obtain by Letters Patent is embodied in the appended claims:

1. A thermostatic control device comprising a body formed with a switch cavity, switch means in said cavity including a spring contact support with a first contact carried thereby and mobile contact means on one side of said spring contact support, said mobile contact means providing a mobile contact movable toward and away from said first contact in response to changes in temperature, a cam member mounted in said body for rotation about an axis, said cam member being positioned on the other side of said spring contact support and being formed with a cam surface engageable with said spring contact support operable in response to rotation of said cam member to deflect said spring contact support and change the position of said first contact, said cam member and body being formed with interengaging generally cylindrical surfaces coaxial with said axis radially locating said cam member with respect to said axis while permitting relative rotation therebetween, said cam member and body also being formed with interengaging planar surfaces substantially perpendicular to said axis on the side of said cam remote from said cam surface, said spring contact support being deflected from its unstressed position by said cam member and producing a force on said cam member tending to maintain engagement between said planar surfaces, and a manually operable stem extending along said axis through said body from the exterior thereof, said stem and cam member being formed with opposed radially extending surfaces which inter-engage to prevent substantial relative rotation therebetween whereby rotation of said stem causes rotation of said cam member, said cam member and stem being free of connections causing disengagement between said planar surfaces in response to movement in said stem.

2. A thermostatic control device as set forth in claim 1 wherein said cam member is formed with an opening along said axis, and said stem projects into said opening with clearance.

3. A thermostatic control device as set forth in claim 1 wherein said stem is provided with axially spaced laterally projecting key means, one of said key means providing said opposed radially extending surfaces on said stem, said body being provided with a keyway permitting the insertion of said stem through said body when said stem is in one position, said cam member and stem being rotatable to operating positions rotationally spaced from said one position, and stop means preventing rotation of said cam member and stem to said one position.

4. A thermostat control device as set forth in claim 3 wherein both of said key means are provided by lateral projections on said stem, one of said projections preventing axial movement of said stem relative to said body in an axial direction toward said switch cavity, and the other lateral projection preventing axial movement of said cam member relative to said stem in said axial direction, said projections and said planar surfaces retaining said cam member and stem mounted on said body.

5. A thermostatic control device as set forth in claim 1 wherein said mobile contact means includes a bimetallic strip supporting said mobile contact and operating to move it into and out of engagement with said first contact in response to changes in temperature.

References Cited
UNITED STATES PATENTS

| | | | |
|---|---|---|---|
| 2,328,152 | 8/1943 | Kuhn et al. | 200—138.2 XR |
| 2,493,294 | 1/1950 | Kronmiller | 200—139 |
| 2,805,302 | 9/1957 | Reis. | |

BERNARD A. GILHEANY, *Primary Examiner.*

H. A. LEWITTER, *Assistant Examiner.*